(12) United States Patent
Gruss et al.

(10) Patent No.: US 8,187,559 B2
(45) Date of Patent: May 29, 2012

(54) HEAT EXCHANGER SYSTEM COMPRISING FLUID CIRCULATION ZONES WHICH ARE SELECTIVELY COATED WITH A CHEMICAL REACTION CATALYST

(75) Inventors: Jean-Antoine Gruss, Seyssinet (FR); Emmanuelle Duval-Brunel, Palaiseau (FR); Andre Van Veen, Lyons (FR); Claude Mirodatos, Lyons (FR)

(73) Assignees: Commissariat a l'Energie Atomique, Paris (FR); Centre National de la Recherche Scientifique, Paris (FR); Renault S.A.S., Boulogne Billancourt (FR)

( * ) Notice: Subject to any disclaimer, the term of this patent is extended or adjusted under 35 U.S.C. 154(b) by 771 days.

(21) Appl. No.: 12/297,628

(22) PCT Filed: Apr. 18, 2007

(86) PCT No.: PCT/EP2007/053806
§ 371 (c)(1),
(2), (4) Date: Oct. 17, 2008

(87) PCT Pub. No.: WO2007/122167
PCT Pub. Date: Nov. 1, 2007

(65) Prior Publication Data
US 2009/0104488 A1 Apr. 23, 2009

(30) Foreign Application Priority Data
Apr. 20, 2006 (FR) ...................................... 06 51389

(51) Int. Cl.
*B01J 8/00* (2006.01)
*B01J 10/00* (2006.01)
(52) U.S. Cl. ........ 422/602; 422/170; 422/176; 422/173; 422/228; 422/220; 422/187; 422/600; 422/601; 422/621; 422/645; 422/198; 429/34; 429/35; 429/38
(58) Field of Classification Search .................. None
See application file for complete search history.

(56) References Cited

U.S. PATENT DOCUMENTS

| | | | |
|---|---|---|---|
| 6,051,331 A * | 4/2000 | Spear et al. ................... | 429/413 |
| 6,472,092 B1 | 10/2002 | Matsuda et al. | |
| 2001/0018140 A1 | 8/2001 | Hermann et al. | |
| 2003/0072699 A1 | 4/2003 | Tonkovich et al. | |
| 2004/0058230 A1 * | 3/2004 | Hsu ................................ | 429/62 |
| 2004/0154788 A1 | 8/2004 | Symonds | |

* cited by examiner

*Primary Examiner* — Kaity V. Handal
(74) *Attorney, Agent, or Firm* — Nixon Peabody LLP

(57) ABSTRACT

The invention relates to a plate (10*a*) intended to be integrated in a stack of plates in a heat exchanger system, the plate comprising a plurality of channels (38) distributed in rows (40), each row comprising side walls (42) arranged opposite one another and spaced apart from one another in a first direction (44), so that two directly consecutive side walls delimit one of the channels (38), the rows being arranged opposite one another and spaced apart from one another in a second direction (46) which is perpendicular to the first. Furthermore, in the fluid circulation zone (20) of the plate incorporating the channels (38), only the latter are coated with a catalyst allowing a chemical reaction.

10 Claims, 4 Drawing Sheets

HEAT EXCHANGER SYSTEM COMPRISING FLUID CIRCULATION ZONES WHICH ARE SELECTIVELY COATED WITH A CHEMICAL REACTION CATALYST

CROSS REFERENCE TO RELATED APPLICATIONS OR PRIORITY CLAIM

This application is a national phase of International Application No. PCT/EP20071053806, entitled "HEAT EXCHANGER SYSTEM COMPRISING FLUID CIRCULATION ZONES WHICH ARE SELECTIVELY COATED WITH A CHEMICAL REACTION CATALYST", which was filed on Apr. 18, 2007 and which claims priority to French Application No. 0651389 filed Apr. 20, 2006.

TECHNICAL FIELD

The invention relates in general to the field of heat exchangers, and preferably to the field of micro heat exchangers in which the heat exchanges obtained are very good due to the high ratio between the heat exchange surfaces and the volume of the heat exchanger.

The invention relates more specifically to heat exchanger systems comprising a stack of plates which alternately form, in a direction of stacking of the plates, a first fluid circulation zone and a second fluid circulation zone, and designed such that a catalytic chemical reaction takes place in at least one of these fluid circulation zones. Therefore, on account of the catalytic chemical reaction which takes place within at least one of these zones, such micro heat exchangers are also known as micro-reactors.

It is noted that many applications are envisaged for the heat exchanger according to the present invention. By way of illustrative example, such a heat exchanger system may take the form of a steam reforming system in which an exothermic catalytic chemical reaction (for example a combustion reaction) takes place within the first fluid circulation zones, and an endothermic steam reforming reaction intended to generate hydrogen takes place within the second fluid circulation zones. It is specified that this type of steam reforming system can be used in a fuel cell installation with a view to supplying hydrogen to the anode of the fuel cell.

To this end, the invention also relates to such a fuel cell installation equipped with the aforementioned steam reforming system, this fuel cell installation naturally finding a multitude of applications among on-board applications (motor vehicle industry, naval industry) and stationary and mobile applications.

PRIOR ART

In the particular application mentioned above concerning steam reforming, use is conventionally made of a micro heat exchanger comprising a stack of plates which alternately form, in a direction of stacking of the plates, a first fluid circulation zone and a second fluid circulation zone, an exothermic catalytic chemical reaction taking place within each first fluid circulation zone, and an endothermic steam reforming reaction intended to generate hydrogen taking place within each second fluid circulation zone.

With such a configuration, the energy required for the endothermic steam reforming reaction is provided by the heat given off by the catalytic chemical reaction carried out in the first zones, this reaction being for example of the combustion reaction type.

In the embodiments of the prior art, the stacking of the plates is carried out in such a way as to obtain an alternation between micro-structured plates dedicated to steam reforming and micro-structured plates dedicated to the combustion reaction, the latter also being known as burner plates. Each of these plates, and in particular the burner plates, has on one of its two faces a network of parallel channels in which a suitable catalyst has been deposited, usually along the entire length of the channels running along this plate.

Furthermore, these straight and parallel channels or microchannels directly connect a main fluid distributor located at the inlet of the channels and a main fluid collector located at the outlet of these same channels, this distributor and collector being respectively arranged close to two opposite ends of the plate in question.

Since the catalytic combustion reaction observed in the burner plates takes place very quickly, especially in the presence of hydrogen, it therefore inevitably takes place largely at the inlet of the different parallel channels. This has the major disadvantage of causing the presence of hot spots in this upstream part of the burner, which has the consequence not only of preventing surface homogeneity of the temperature on the burner plates but also of greatly increasing the risk of formation of nitrogen oxides within the first fluid circulation zones. This is because although, for example, the temperature required in order to carry out the steam reforming reaction of petrol in the steam reforming plates is approximately 750° C., it is noted that the harmful formation of nitrogen oxides in the burner plates is greatly favoured once the temperature of these same plates reaches the value of 920° C., which value can nevertheless easily be reached at the inlet of the channels where most of the catalytic combustion reaction takes place. Furthermore, it is obvious that the appearance of these hot spots causes extremely high thermal stresses on the plates, so that it is necessary to choose suitable materials, which are often expensive.

It is also specified that the lack of surface homogeneity of the temperature on the burner plates cannot fail to translate into a lack of surface homogeneity of the temperature on the steam reforming plates, which in turn are likely to exhibit hot spots. On the other hand, certain other parts of the steam reforming plates may conversely not have a sufficiently high temperature to allow the steam reforming reaction, due to the lack of uniformity in the supply of energy provided by the catalytic combustion reaction.

Finally, the hot spots are also harmful to the catalyst, since they are likely on the one hand to impair the attachment of the catalytic layer to the walls and on the other hand to irreversibly degrade the catalytic activity of this same layer.

In order to solve this general problem regarding the surface homogeneity of the temperature of the plates of the heat exchanger system, several solutions have been proposed in the prior art, including one which aims to inject fuel and/or air into the burner plates at different points. However, this solution does not appear satisfactory due to the increased complexity of the air injection system and/or fuel injection system that it requires.

Another envisaged solution was to reduce the richness of the air/fuel mixture introduced into the burner plates, in order to limit the flame temperature to a certain value (920° C. for petrol steam reforming), above which the harmful formation of nitrogen oxides is observed. However, heat balances have shown that this solution leads to a much higher fuel consumption in the burner, and consequently to a drastic drop in yield of the associated steam reforming system.

SUMMARY OF THE INVENTION

The invention therefore generally aims to propose a plate intended to be integrated in a stack of plates in a heat exchanger system, and also such a heat exchanger system, these elements remedying at least partially the abovementioned disadvantages relating to the embodiments of the prior art.

To this end, the invention firstly relates to a plate intended to be integrated in a stack of plates in a heat exchanger system, this plate delimiting on one of its two faces a fluid circulation zone which is at least partially coated with a catalyst allowing a catalytic chemical reaction within this zone, the fluid circulation zone comprising a network of channels. According to the invention, the network of channels comprises a plurality of basic channels distributed in rows, each row comprising a plurality of side walls arranged opposite one another and spaced apart from one another in a first direction, so that any two directly consecutive side walls delimit one of the basic channels of the row, these rows of basic channels being arranged opposite one another and spaced apart from one another in a second direction which is perpendicular to the first. Furthermore, in the fluid circulation zone, only the basic channels are at least partially coated with the catalyst.

Consequently, the selective distribution of the catalyst in basic channels which are distributed in rows spaced apart on the plate generally makes it possible to obtain a considerable surface homogeneity of the temperature of this plate, which is intended to be the site of an endothermic or exothermic catalytic reaction. Compared to those encountered in the prior art, the basic channels provided in the present invention are present in greater number and are shorter in length, so that it is possible to achieve a better distribution of the hot/cold spots on the plate. Effectively, with the geometry specific to the present invention, the inlets of the basic channels can themselves be distributed homogeneously over the entire face of the plate in question, and are no longer all confined close to one end of the plate as was previously the case. Furthermore, since the number of channels is increased and the quantity of fuel is the same, the hot/cold spots observed at the inlet of these basic channels are not only better distributed but also exhibit more acceptable temperatures.

In addition, the shorter the length of the basic channels, the more the effects of axial conduction in the plates make it possible to limit the hot/cold spots.

Finally, in this solution in which the catalytic reaction takes place exclusively in the basic channels and not in the other parts of the fluid circulation zones such as the spaces between rows, the short length of the basic channels makes it possible to substantially minimise the pressure losses, thereby allowing a reduction in size of the peripheral devices which are intended to equip the heat exchanger system, such as pumps, compressors, etc.

Preferably, the fluid circulation zone also comprises a fluid inlet and a fluid outlet, a main fluid distributor opening into the inlet and a main fluid collector opening into the outlet. It is then provided that the main distributor and the main collector each extend generally in the second direction and are located respectively at two opposite ends, as seen in the first direction, of the network of channels formed by the plurality of rows.

In addition, the circulation zone comprises a plurality of secondary fluid distributors, each opening into the main fluid distributor and located between two directly consecutive rows of basic channels, and also a plurality of secondary fluid collectors, each opening into the main fluid collector and also located between two directly consecutive rows of basic channels.

More preferably, between two directly consecutive rows of basic channels, the secondary fluid distributor intended to supply fluid to the basic channels of one of the two rows, and the secondary fluid collector intended to collect the fluid escaping from the basic channels of the other of the two rows, are separated by a wall element which is inclined in the first and second directions. With the presence of this wall element forming a separation, it is then ensured on the one hand that the basic channels of each of the rows are all supplied with fluid coming from the inlet and which has not already reacted in another channel of the zone, and on the other hand that the fluid leaving each of the basic channels is evacuated towards the main collector without being able to reach the inlet of other channels.

By way of example, in order to obtain the aforementioned effects in the best possible way, it may be provided that the wall element is connected to a side wall of one of the two rows which is located closest to the end of this row in the first direction, and is also connected to a side wall of the other of the two rows which is located closest to the end of this other row in a direction opposite the first direction.

Thus, the main distributor and collector, and secondary distributors and collectors, each have a substantially triangular shape in plan view, which makes it possible to distribute and evacuate in the best possible way the fluid passing through the basic channels.

Preferably, the fluid inlet and the fluid outlet are located respectively at two opposite ends, as seen in the second direction, of the network of channels formed by the plurality of rows.

By way of example, each basic channel has a width of between approximately 0.1 and 1 mm, this plate being preferably intended to be integrated within a micro heat exchanger.

Furthermore, each basic channel of the network of channels is at least partially coated with the catalyst, preferably over its entire length, and preferably over its entire wall.

Still by way of example, the catalyst is made from a material selected from the group consisting of iron-nickel alloys, polymers and ceramics, the latter being refractory materials which are entirely suitable for generating/withstanding a catalytic hydrocarbon combustion reaction. Nevertheless, it is noted that other metal materials can of course be envisaged, depending on various parameters such as the material from which the plate is made, the method for producing the latter, the manner in which this catalyst is deposited, the operating temperature, and the resistance of the material to the reagents and to the reaction products.

According to one preferred embodiment, the other of the two faces of the plate also delimits another fluid circulation zone, which may be of an identical or similar design to the first zone described above. In such a case, it is then provided that this other fluid circulation zone is at least partially coated with a catalyst allowing a catalytic chemical reaction within this second zone, preferably with a selective distribution of the catalyst only in the basic channels distributed in rows.

In this configuration in which the two faces of the plate are micro-structured, each of them therefore has a fluid circulation zone provided to receive a fluid intended to carry out a heat exchange with the fluid provided for circulating in the other fluid circulation zone of the plate.

The invention also relates to a heat exchanger system comprising a stack of plates which alternately form, in a direction of stacking of the plates, a first fluid circulation zone and a second fluid circulation zone, the first fluid circulation zone being at least partially coated with a catalyst allowing a catalytic chemical reaction within this first zone. According to the invention, at least one of the plates of the stack is a plate such as that defined above, making it possible by means of its fluid circulation zone to form at least partially one of the first fluid circulation zones of the heat exchanger system.

Of course, it is pointed out that such a plate which forms the subject matter of the present invention and which is described above may not only be integrated within the stack so as to form at least partially one of said first fluid circulation zones with its own fluid circulation zone, but may also be integrated in the stack so as to form at least partially one of the second fluid circulation zones, when the latter are also the site of a catalytic chemical reaction. To this end, it is therefore effectively envisaged, in a non-limiting manner, that each second fluid circulation zone of the heat exchanger system is also at least partially coated with a catalyst allowing a catalytic chemical reaction within this second zone.

Preferably, the aforementioned stack is created entirely with such plates according to the present invention, so that the latter form all of the first and second fluid circulation zones of the heat exchanger system. Nevertheless, it would be possible for example to provide a stack which alternates micro-structured plates according to the present invention, each defining at least partially a first circulation zone, and any other plates which each define at least partially a second circulation zone, which may or may not be coated with a catalyst, without departing from the scope of the invention.

Similarly, here too, the heat exchanger system according to the invention may be designed so as to circulate the hot fluid, for example originating from an exothermic catalytic chemical reaction, in the first zones, and to circulate the cold fluid, for example originating from an endothermic catalytic chemical reaction, in the second zones, or vice versa.

Finally, it is pointed out that the first and second circulation zones may of course have a different geometry.

The present invention also relates to a steam reforming system comprising such a heat exchanger system, this steam reforming system being designed such that an exothermic catalytic chemical reaction takes place within each first fluid circulation zone, and such that an endothermic steam reforming reaction intended to generate hydrogen takes place within each second fluid circulation zone.

Of course, this application of the steam reforming heat exchanger system is in no way limiting and may extend to any other system in which there is provided a heat exchange between a first fluid passing through the first zones and a second fluid passing through the second zones, it being possible for the catalytic chemical reaction within the first circulation zones indifferently to be of an exothermic or endothermic nature, depending on the requirements encountered.

The possible applications of the invention therefore include the reforming, by means of water and/or carbon dioxide, of hydrocarbons or alcohols such as methane, petrol, diesel, kerosene, ethanol, methanol or the like. The mixture of water and/or carbon dioxide and hydrocarbon or alcohol that is to be reformed circulates and reacts endothermically in a first zone, whereas a reheating fluid or a mixture of hydrocarbons (or alcohol) and air circulates in the second zone of the heat exchanger, producing an exothermic reaction. This exothermic reaction may be for example a catalytic combustion or a preferential oxidation (PrOx) reaction.

The catalytic dehydrogenation of methylcyclohexane (cycloalkane in general) is also included. Methylcyclohexane and toluene circulate in the first zone of the heat exchanger, where an endothermic catalytic dehydrogenation reaction takes place, the second zone consisting of a burner which is supplied with toluene and hydrogen. The temperature levels are lower than for the steam reforming of petrol, the dehydrogenation reaction taking place at around 375° C. Nevertheless, the temperature in the reaction has to be as homogeneous as possible so as not to deteriorate the catalysts.

It may also involve catalytic combustion for the vaporisation of a fluid. The mixture of hydrocarbons (or alcohol) and air circulates in a first zone of the heat exchanger and produces an exothermic reaction, whereas flowing in the second zone is a fluid which vaporises, a phenomenon which is endothermic. The fluid which vaporises may for example be water which is intended to be used in a "reformer" and which is preheated, vaporised and superheated by this system.

It also includes catalytic combustion for devices for generating an electric current by thermoelectric conversion (Peltier effect, thermionic effect or other solid-state principles). In this case, a mixture of hydrocarbons (or alcohol) and air circulates and reacts exothermically in one of the zones, whereas a cooling fluid (air, oil, water, coolant, etc.) circulates in the second zone of the heat exchanger, the thermoelectric conversion system being inserted between the 2 zones.

It may also involve catalytic combustion for systems for reheating fluids, mini stoves (portable for example). In this case, a mixture of hydrocarbons (or alcohol) and air circulates and reacts exothermically in one of the zones, whereas the fluid to be reheated (air, oil, water, etc.) circulates in the second zone of the heat exchanger.

Finally, mention may also be made of catalytic combustion for compact systems for generating cold by means of thermodynamic or thermochemical systems which therefore require a heat source (external combustion cycles of the Stirling type, pulsed tubes, thermoacoustic systems, adsorption or absorption engines, etc.). In this case, a mixture of hydrocarbons (alcohol) and air circulates and reacts exothermically in one of the zones, whereas there circulates in the second zone the fluid that is to be reheated, which may be a gas of the air, helium, hydrogen, etc. type or a liquid (for example ammonia) suitable for the thermodynamic or thermochemical cycle.

Finally, the invention relates to a fuel cell installation comprising a fuel cell and a steam reforming system intended to produce hydrogen so as to deliver it to said fuel cell, this steam reforming system being of the type described above, that is to say consisting of a heat exchanger system according to the present invention.

Other advantages and features of the invention will become apparent from the following detailed and non-limiting description.

BRIEF DESCRIPTION OF THE DRAWINGS

This description will be given with reference to the appended drawings, in which.

DETAILED DESCRIPTION OF PREFERRED EMBODIMENTS

Figure 1:
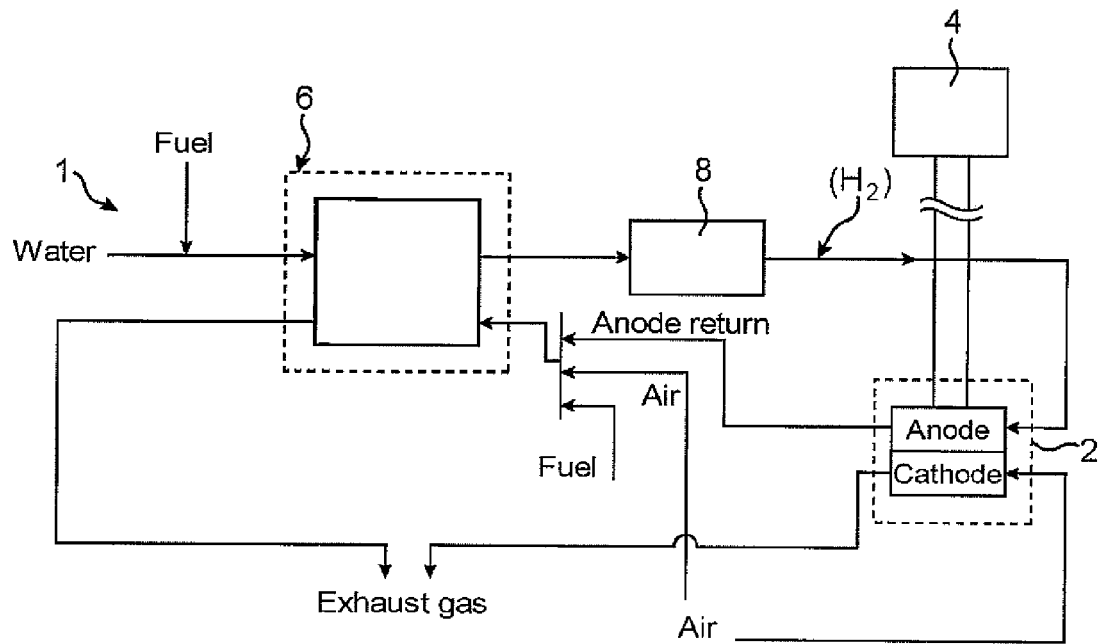
FIG. 1 shows a schematic view of a fuel cell installation according to a preferred embodiment of the present invention.

With reference first to FIG. 1, there can be seen a fuel cell installation 1 according to a preferred embodiment of the present invention.

This installation 1 therefore incorporates a fuel cell 2, for example of the PEMFC ("Proton Exchange Membrane Fuel Cell") type, comprising a proton exchange membrane as electrolyte. In a manner known to the person skilled in the art, a fuel cell is an assembly comprising generally a plurality of basic cells stacked one above the other. In each of the basic cells of the fuel cell, an electrochemical reaction takes place between two reagents which are introduced continuously into the basic cells. The fuel (hydrogen) is brought into contact with the anode, while the oxidant (oxygen) is brought into contact with the cathode, the latter being separated from the anode via the electrolyte of the ion exchange membrane type.

At the anode, an oxidation reaction of the fuel takes place, represented by the following reaction scheme:

$$2H_2 \rightarrow 4H^+ + 4e^-$$

In the same way, at the cathode, a reduction reaction of the oxidant takes place, according to the following reaction scheme:

$$O_2 + 4H^+ + 4e^- \rightarrow 2H_2O$$

This is therefore an electrochemical reaction, and the energy created in the process is converted into electrical energy. Protons $H^+$ flow from the anode towards the cathode, passing through the electrolyte, in order to arrive at an external entity 4 so as to work towards producing electrical energy. By way of example, this entity 4 may be an electric motor, a battery, a power grid, etc.

Furthermore, the installation 1 comprises a steam reforming system 6 which also forms the subject matter of the present invention, and the main function of which is to produce hydrogen from a fuel, such as a liquid fuel of the petrol, diesel, alcohol (ethanol) type, or else such as a gaseous fuel of the LPG, CNG, methane, synthesis gas, etc. type.

The hydrogen obtained from this steam reforming system 6, the design of which will be described in detail below, is directed in a known manner towards the anode of the cell 2 after the reformate containing this hydrogen has passed through a purifier 8, as shown schematically in FIG. 1. This is because the reformate coming from the steam reforming system 6 is rich in hydrogen but contains a large quantity of carbon monoxide CO which is poisonous to the catalysts of the cell 2, and which therefore has to be reduced as far as possible by means of this purifier 8.

Finally, the installation 1 comprises a set of auxiliary equipment items allowing the proper functioning of this installation, said equipment items including air circuits, water circuits, cooling circuits, etc.

More particularly with regard to the steam reforming system 6, the latter comprises in a known manner a steam reforming part in which an endothermic steam reforming reaction takes place in order to generate hydrogen which is intended to supply the anode of the cell 2, and a burner part within which an exothermic catalytic combustion reaction takes place, said reaction being intended to supply the energy necessary for the aforementioned steam reforming reaction.

Thus, the steam reforming part is supplied with a mixture of water and fuel so as to produce the aforementioned reformate, whereas the burner part is supplied with a highly reactive mixture of air and fuel which, after combustion, produces exhaust gases which are extracted from the system 6, as shown schematically in FIG. 1.

Figure 2:
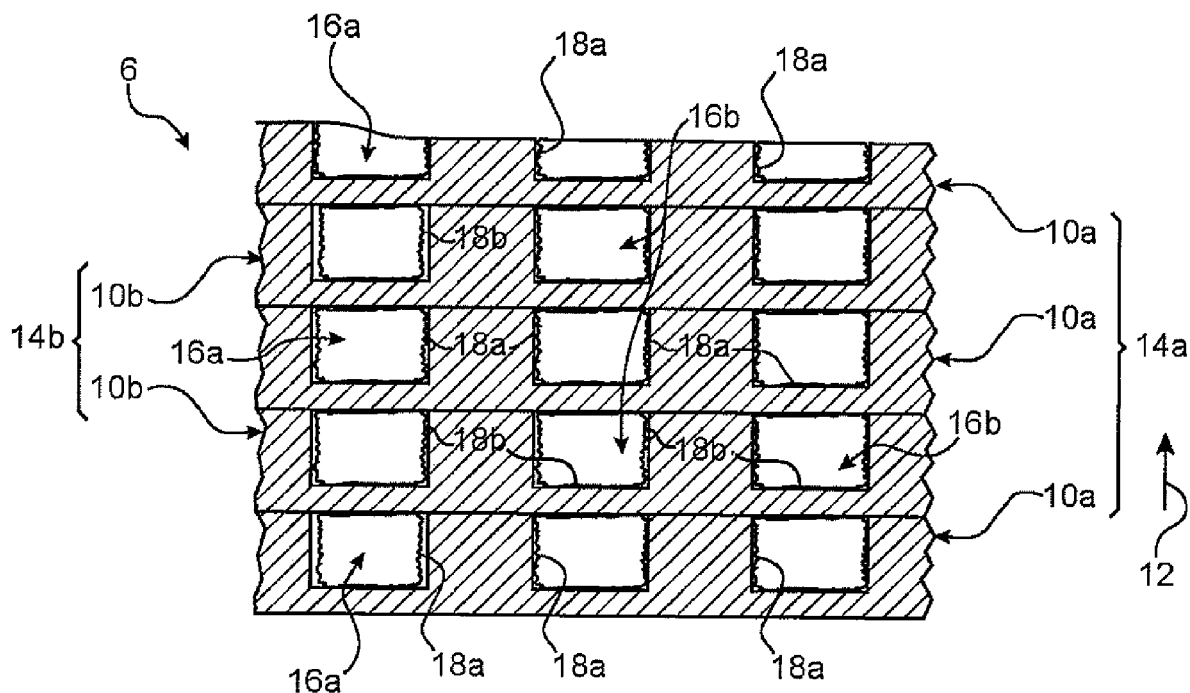
FIG. 2 shows a partial cross-sectional view of the steam reforming system equipping the installation shown in FIG. 1, and being in the form of a preferred embodiment of the present invention.

With reference now to FIG. 2, there can be seen in greater detail one part of the steam reforming system 6, the latter being generally formed by means of a heat exchanger system having a stack of metal plates 10a, 10b stacked in a direction of stacking which is orthogonal to these same plates, shown schematically by the arrow 12. By way of example, the plates of this stack may be assembled to one another by means of a conventional diffusion welding technique.

The first plates 10a or burner plates together form the burner part 14a of the system 6, these plates 10a alternating with second plates 10b or steam reforming plates, which second plates 10b together form the steam reforming part 14b of this same system 6.

In this preferred embodiment of the steam reforming system 6, which is therefore similar to a heat exchanger system due to the heat exchange which takes place between the burner part 14a and the steam reforming part 14b, each of the aforementioned plates has a flat face and an opposite face which is "micro-structured", forming a fluid circulation zone which is provided in particular with a plurality of channels or microchannels. As can clearly be seen in FIG. 2, each microstructured face of a plate 10a, 10b is in contact with the flat face of the plate which is directly consecutive thereto in the direction of stacking 12, and vice versa.

Thus, the stacked metal plates 10a, 10b alternately form, in the direction 12, a first fluid circulation zone 16a and a second fluid circulation zone 16b, each of these first and second zones 16a, 16b being respectively at least partially coated with a catalyst 18a, 18b allowing a catalytic chemical reaction within these zones.

Of course, the catalyst 18a is in this case provided to ensure the catalytic combustion in the plates 10a of the burner part 14a, while the catalyst 18b is provided to ensure the catalytic steam reforming reaction in the plates 10b of the steam reforming part 14b.

By way of example, it is specified that the geometry of the fluid circulation zones delimited by the plates 10a preferably coincides perfectly, when seen in the direction of stacking 12, with the geometry of the fluid circulation zones delimited by the plates 10b, although an offset between these two geometries could alternatively be envisaged without departing from the scope of the invention. In this preferred embodiment in which each fluid circulation zone delimited on the structured face of a plate 10a, 10b constitutes one of said first or second fluid circulation zones 14a, 14b of the steam reforming system, it is therefore preferably provided to adopt an identical or similar design for the burner plates 10a and the steam reforming plates 10b.

For this reason, only one burner plate 10a of the stack shown in FIG. 2 will now be described in a detailed manner, with reference jointly to FIGS. 3 and 4a.

In these figures, it can be seen that the burner plate 10a comprises a fluid circulation zone 20 on that one of its two faces which is "micro-structured" and lies opposite the other, substantially flat face.

The fluid circulation zone 20, which is intended to constitute one of the first fluid circulation zones 16a of the steam reforming system shown in FIG. 2, generally comprises a fluid inlet 24, via which the air/fuel mixture intended for the catalytic combustion arrives, a main fluid distributor 26 which opens into the inlet 24, a plurality of secondary fluid distributors 28, each opening into the main distributor 26, a network of channels 30, a plurality of second fluid collectors 32, each opening into a main collector 34, and finally a fluid outlet 36, into which the main collector 34 opens and via which the exhaust gases resulting from the combustion observed in the network of channels 30 escape.

Figure 3:
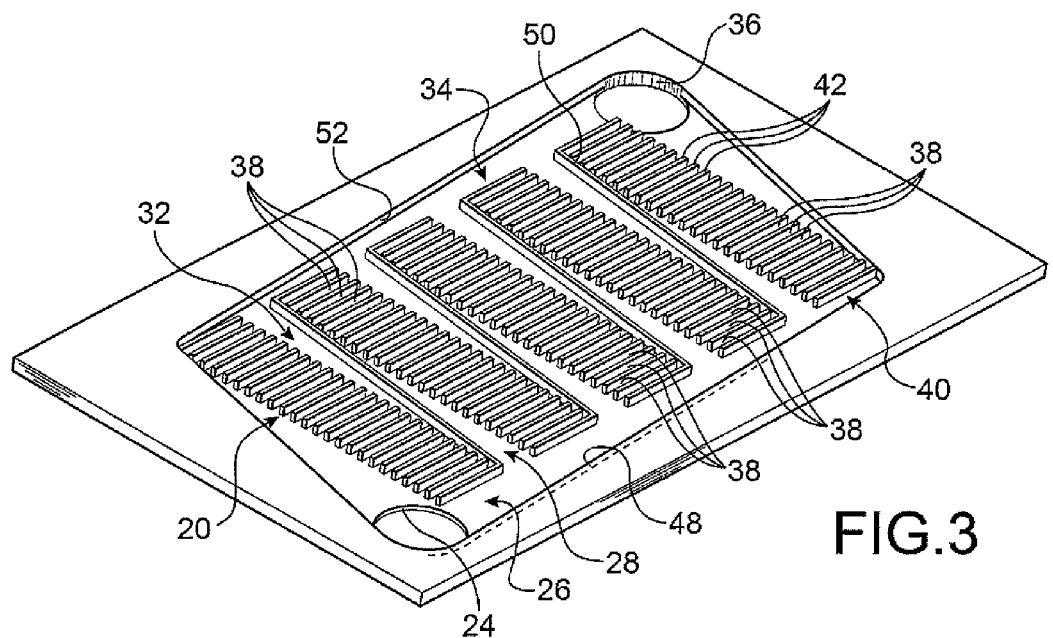
FIG. 3 shows a detailed perspective view of a plate forming an integral part of the steam reforming system shown in FIG. 2, this plate being in the form of a preferred embodiment of the present invention.
Figure 4A:
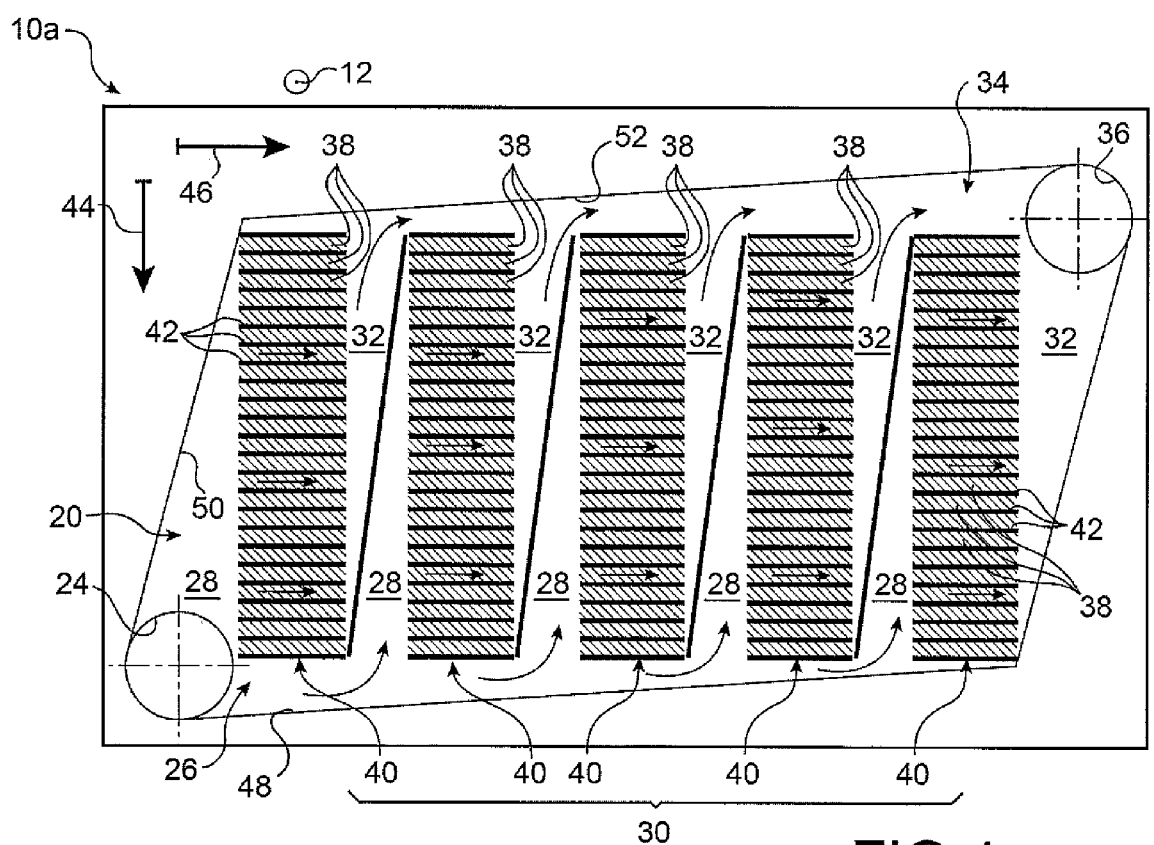
FIG. 4a shows a plan view of the plate shown in FIG. 3.

More specifically, the network of channels 30 preferably consists entirely of a plurality of basic channels 38, also known as reactive channels, which are distributed in rows 40 over the micro-structured face of the plate in question, the number of said rows extending parallel to the plate being five for example, as shown in FIGS. 3 and 4*a*.

Each row 40 comprises a plurality of side walls 42 arranged opposite one another and spaced apart from one another in a first direction 44, referred to as the row direction, so that any two of these side walls 42 which are directly consecutive to one another in the direction 44 delimit one of the basic channels 38 of the row 40.

Furthermore, these rows 40 of basic channels 38 are arranged opposite one another and spaced apart from one another in a second direction 46 which is perpendicular to the aforementioned direction 44, this direction likewise corresponding to the direction of flow of the fluid through the basic channels, since the side walls defining the latter are oriented in this same direction 46.

One of the special features of the present invention lies in the fact that, in the fluid circulation zone 20, only the basic channels 38, the arrangement of which has just been described, are at least partially coated with the catalyst shown schematically by the shaded area in FIG. 4*a*. In this respect, it is pointed out that the catalyst is preferably disposed over the entire length of each channel 38, and preferably on each of the two side walls and on the bottom of each of these channels 38 which have a substantially square or rectangular cross section, or else possibly a rounded cross section, for example in such a way as to have the shape of a U.

By way of example, the width of the channels 38 in the direction 44, corresponding also to the direction of the width of the plate 10*a*, may be around 0.7 mm. However, it is possible to provide a width of between approximately 0.1 and 1 mm. Moreover, the depth of the channels 38 in the direction of stacking 12 may be around 0.4 mm. However, it is possible to provide a depth of between approximately 0.1 and 1 mm. With regard to the spacing between two directly consecutive channels 38 of one and the same row 40, in the direction 44, said spacing is set at approximately 0.5 mm, but may be provided between approximately 0.1 and 1 mm. Of course, this spacing corresponds to the width of the side walls 42 in this same first direction 44. Still by way of example, the length of each channel 38 in the direction 46 may be set at around 20 mm, and more generally between approximately 5 and 100 mm. Finally, the spacing between two rows 40 which are directly consecutive, in the direction 46, may be set at around 10 mm, and more generally between approximately 5 and 50 mm.

The selective distribution of the catalyst carried out as described above therefore implies that the other constituent parts of the circulation zone used by the fluid during operation, that is to say the inlet 24, the distributors 26, 28, the collectors 32, 34 and the outlet 36, are not coated with this same catalyst. This generally makes it possible to obtain a high degree of surface homogeneity of the temperature of this plate 10*a*, since the basic channels 38 are very considerable in number, and since their inlets constituting the portion of each channel in which most of the catalytic combustion reaction takes place can themselves be distributed relatively homogeneously over the entire micro-structured face of the plate, due to the arrangement in rows spaced apart in the direction 46.

By way of example, it is noted that the number of reactive channels 38 is multiplied by the number of rows 40 compared to the number of channels encountered on the similar plates of the prior art.

Still with reference to FIGS. 3 and 4*a*, the main distributor 26 and the main collector 34 each extend generally in the second direction 46 and are located respectively at two opposite ends of the rows 40, as seen in the first direction 44. In this regard, the main distributor 26 is partially delimited by the last side wall 42 of each of the rows 40, as seen in the direction 44 as shown in FIG. 4*a*. Moreover, it is also delimited by a side face 48 which is slightly inclined with respect to the direction 46, so that, in plan view, this distributor 26 takes roughly the shape of a triangle starting from a small base located at the inlet 24 close to the first row 40 as seen in the direction 46, and extending generally in the direction 46 towards a tip opposite this small base, this tip being located at the last row 40 as seen in the direction 46. The two large sides of the triangle are therefore formed respectively by the last side walls 42 of the rows 40, and by the face 48.

This triangular geometry of the main distributor 26 makes it possible to guarantee a uniform distribution of the fluid towards the secondary fluid distributors 28, which each open into the main distributor 26 between two directly consecutive rows 40, and which are each associated with a given row 40. More specifically, each secondary distributor 28 is partially delimited by the inlets of the channels 38 of the associated row 40. Furthermore, it is also delimited by a wall element 50 located between two rows 40 and inclined in the first and second directions 44, 46, so that, in plan view, this distributor 28 takes roughly the shape of a triangle starting from a small base located at the connection to the main distributor 26, that is to say at the last side wall 42 as seen in the direction 44, and generally extending in a direction opposite the direction 44 towards a tip opposite this small base, this tip being located at the first side wall 42 of the associated row, still as seen in the direction 44. Thus, the two large sides of the triangle are formed respectively by the inlets of the channels 38, and by the element 50.

Here again, the triangular geometry of the secondary distributors 28 makes it possible to guarantee a uniform distribution of the fluid towards the inlets of the channels 38, all of which open into their associated secondary distributor 28.

For all the rows 40 with the exception of the first, as seen in the direction 46, the wall element 50 located in a space between rows is connected to the side wall 42 of the non-supplied row which is located closest to the end of this row in the first direction 44, namely the last row. Furthermore, it is also connected to the side wall 42 of the supplied row which is located closest to the end of this row in a direction opposite said first direction 44, that is to say the first wall 42 in the first direction 44.

With regard to the secondary distributor 28 supplying the first row 40, its wall element 50 is located parallel to the others and, like the side face 48, defines a limit of the fluid circulation zone 20, taking roughly the shape of a parallelogram. One of the two ends of this wall element 50 is therefore connected to the first side wall 42 of the first row 40, as seen in the directions 44, 46, while its other end is located close to the fluid inlet 24, and forms the join with the aforementioned side face 48.

Still with reference to FIGS. 3 and 4*a*, it can be seen that the main collector 34 is partially delimited by the first side wall 42 of each of the rows 40, as seen in the direction 44 as shown in FIG. 4*a*. Moreover, it is also delimited by a side face 52 which is slightly inclined with respect to the direction 46, so that, in plan view, this collector 34 takes roughly the shape of a triangle starting from a small base located at the outlet 36 close to the last row 40 as seen in the direction 46, and extending generally in the direction opposite the direction 46 towards a tip opposite this small base, this tip being located at the first row 40 as seen in the direction 46. The two large sides of the triangle are therefore formed respectively by the first side walls 42 of the rows 40, and by the face 52.

This triangular geometry of the main collector 34 makes it possible to guarantee a uniform evacuation of the fluid coming from the secondary fluid collectors 32, which each open into the main collector 34 between two directly consecutive rows 40, and which are each associated with a given row 40. More specifically, each secondary collector 32 is partially delimited by the outlets of the channels 38 of the associated row 40. Furthermore, it is also delimited by the aforementioned wall element 50 located between two rows 40 and inclined in the first and second directions 44, 46, so that, in plan view, this collector 32 takes roughly the shape of a triangle starting from a small base located at the connection to the main collector 34, that is to say at the first side wall 42 as seen in the direction 44, and extending generally in the direction 44 towards a tip opposite this small base, this tip being located at the last side wall 42 of the associated row, still as seen in the direction 44. Thus, the two large sides of the triangle are formed respectively by the outlets of the channels 38, and by the element 50.

Here again, the triangular geometry of the secondary collectors 32 makes it possible to guarantee a uniform evacuation of the fluid coming from the outlets of the channels 38, all of which open into their associated secondary collector 32.

As mentioned above, for all the rows 40 with the exception of the last, as seen in the direction 46, the wall element 50 located in the space between rows is connected to two opposite side walls 42, belonging respectively to the two consecutive rows 40. With regard to the secondary collector 32 allowing the evacuation of the fluid coming from the last row 40, its wall element 50 is located parallel to the others and, like the side face 52, defines a limit of the fluid circulation zone 20. One of the two ends of this wall element 50 is therefore connected to the last side wall 42 of the last row 40, as seen in the directions 44, 46, while its other end is located close to the fluid outlet 36, and forms the join with the aforementioned side face 52. Consequently, the small sides of the zone 20 in the shape of a parallelogram are formed by the two elements 50 located at the two opposite ends of the plate 10a, in the direction 46, while the large sides of the parallelogram are formed by the faces 48 and 52.

Finally, as can be seen in FIGS. 3 and 4a, it is noted that the inlet 24 and the outlet 36, respectively arranged close to the two most spaced-apart points of the parallelogram, can each take the shape of an orifice passing through the plate 10a in the direction of stacking 12.

Figure 4B:
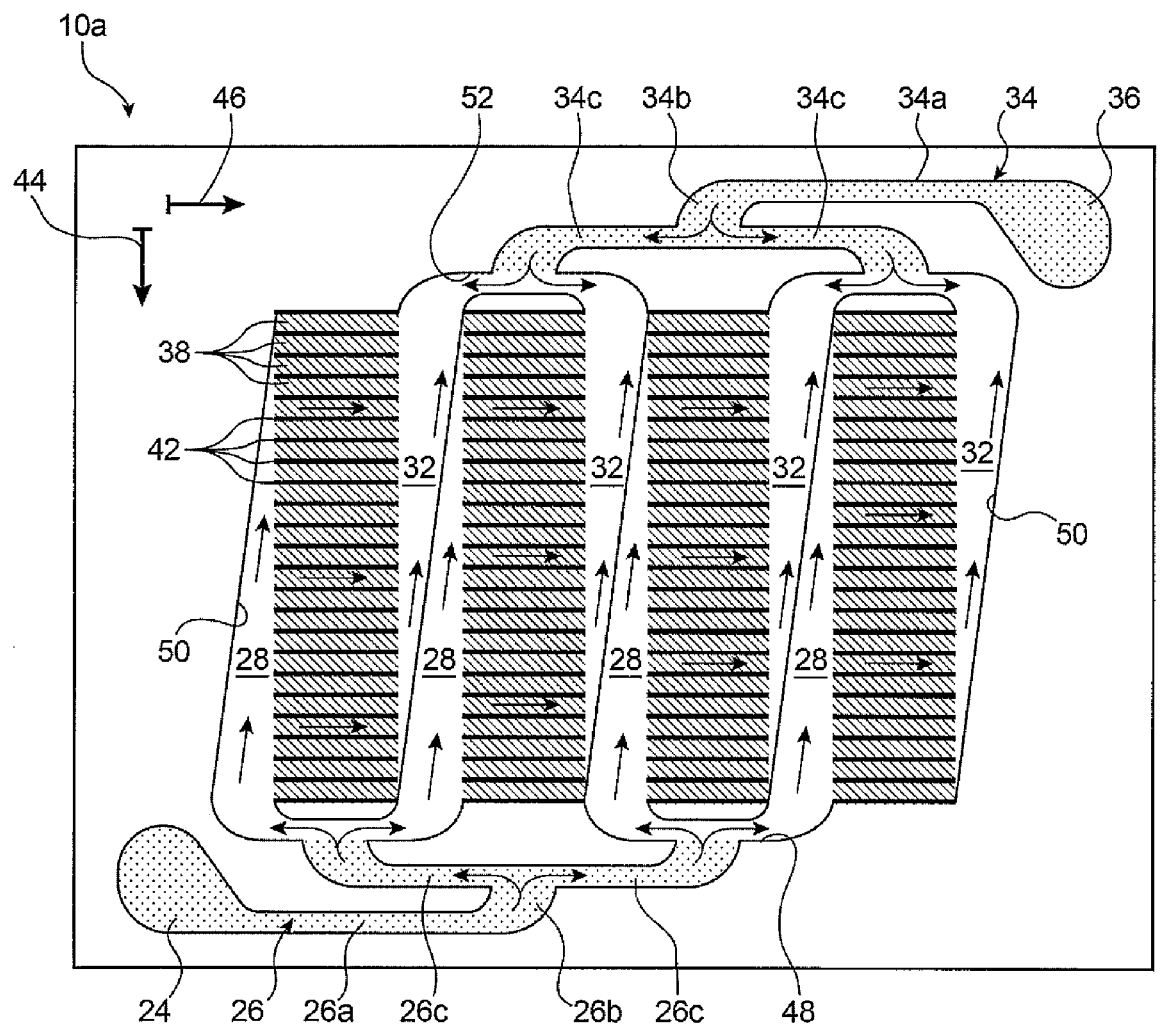
FIG. 4b shows a view similar to that of FIG. 4a, the plate being in the form of another preferred embodiment of the present invention.

With reference to FIG. 4b, the plate 10a can be seen in another preferred embodiment of the present invention. It has a large number of points in common with that described above and, in this regard, the elements bearing the same numerical references correspond to identical or similar elements.

It can be seen that the face of the plate in question has the engraving of a parallelogram which is substantially similar to that described above, incorporating in particular the basic channels 38 coated with catalyst, and also the secondary distributors and collectors 28, 32 roughly in the shape of a triangle.

By contrast, the main distributor 26 and the main collector 34 are no longer integrated within the parallelogram, its substantially parallel and opposite side faces 48 and 52, which are preferably oriented in the direction 46, now each alternately defining ends of secondary distributors/secondary collectors, and ends of rows 40.

As can be seen in FIG. 4b, the main distributor 26 has a first channel 26a connected to the inlet 24, and at the end of which there is provided a branching 26b from which two channels 26c depart, each of said channels supplying two secondary distributors 28 which are consecutive in the direction 46. For this purpose, the end of each channel 26c opens at the side face 48, in line with a row 40, on either side of which there are arranged the two secondary distributors 28 to be supplied.

Similarly, the main collector 34 has a first channel 34a connected to the outlet 36, and at the end of which there is provided a branching 34b from which two channels 34c depart, each of said channels communicating with two secondary collectors 32 which are consecutive in the direction 46. For this purpose, the end of each channel 34c opens at the side face 52, in line with a row 40, on either side of which there are arranged the two secondary collectors 32 in question.

One of the special features of this preferred embodiment lies in the fact that the main distributor 26 and the main collector 34 may be formed in such a way as to pass through the plate, namely may be engraved through the entire thickness thereof, just like the inlet 24 and outlet 36. Thus, only the parallelogram and the elements located therein, such as the channels 38, are formed so as to open out rather than passing all the way through.

Figure 5:
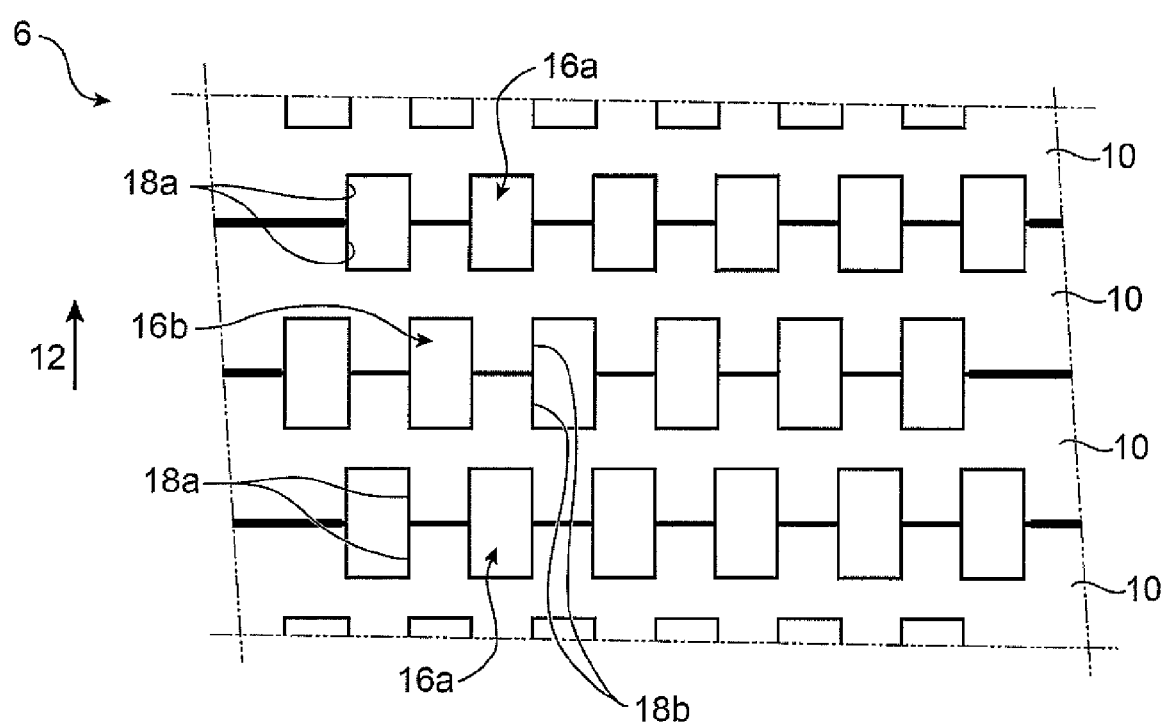
FIG. 5 shows a partial cross-sectional view of the steam reforming system equipping the installation shown in FIG. 1, and being in the form of another preferred embodiment of the present invention.

With reference now to FIG. 5, there can be seen a part of a steam reforming system 6 capable of equipping the installation shown in FIG. 1, and being in the form of another preferred embodiment of the present invention.

In this preferred embodiment, although the steam reforming part and the burner part of the system 6 are also defined by a stack of plates in the direction 12, each of the plates 10 is no longer exclusively dedicated to the formation of one of the two parts mentioned above, but rather has two opposite micro-structured faces serving respectively to form the steam reforming part and the burner part. In effect, each of the two faces delimits a fluid circulation zone, the geometry of which may be identical or similar to that described above, one being partially coated with the catalyst 18a allowing the catalytic combustion, and the other being partially coated with the catalyst 18b allowing the catalytic steam reforming reaction.

In order to create the stack of these plates 10 which are all substantially identical, said plates are alternately turned over so that the micro-structured face coated with the catalyst 18a of a given plate is located opposite and in contact with the micro-structured face coated with the catalyst 18a of the directly consecutive plate and, in an analogous manner, so that the micro-structured face coated with the catalyst 18b of the given plate is located opposite and in contact with the micro-structured face coated with the catalyst 18b of the directly consecutive plate.

Thus, each of the first and second fluid circulation zones 16a, 16b of the steam reforming system 6 is formed by two micro-structured faces located opposite one another and belonging to two separate and directly consecutive plates 10.

As can be seen in FIG. 5, it is provided in this preferred embodiment that the geometry of the first fluid circulation zones 16a delimited by the plates 10 is offset, as seen in the direction of stacking 12, with respect to the geometry of the second fluid circulation zones 16b delimited by these same plates 10, each of these zones 16a, 16b preferably having a network of basic channels arranged in rows as shown in FIGS. 3 and 4a.

This technical solution which aims to use two fluid circulation zones belonging to two consecutive plates in order to form a single circulation zone of the steam reforming system generally makes it possible to ensure a good heat transfer between the exothermic catalytic combustion reaction observed in the first zones 16a and the endothermic catalytic steam reforming reaction encountered within the second zones 16b.

Of course, various modifications may be made by the person skilled in the art to the invention just described, solely by way of non-limiting example.

The invention claimed is:

1. Plate (10, 10a, 10b) intended to be integrated in a stack of plates in a heat exchanger system, said plate delimiting on one of its two faces a fluid circulation zone (20) which is at least partially coated with a catalyst (18a, 18b) allowing a catalytic chemical reaction within this zone, said fluid circulation zone (20) comprising a network of channels (30), characterised in that said network of channels (30) comprises a plurality of basic channels (38) distributed in rows (40), each row comprising a plurality of side walls (42) arranged opposite one another and spaced apart from one another in a first direction (44), so that any two directly consecutive side walls delimit one of the basic channels (38) of said row, said rows (40) of basic channels (38) being arranged opposite one another and spaced apart from one another in a second direction (46) which is perpendicular to the first (44), and characterised in that, in said fluid circulation zone (20), only the basic channels (38) are at least partially coated with said catalyst (18a, 18b), said fluid circulation zone (20) also comprises a fluid inlet (24) and a fluid outlet (36), a main fluid distributor (26) opening into said inlet and a main fluid collector (34) opening into said outlet, and additionally comprises a plurality of secondary fluid distributors (28), each opening into said main fluid distributor (26) and located between two directly consecutive rows (40) of basic channels, and also a plurality of secondary fluid collectors (32), each opening into said main fluid collector (34) and also located between two directly consecutive rows (40) of basic channels; and between two directly consecutive rows (40) of basic channels, the secondary fluid distributor (28) intended to supply fluid to the basic channels (38) of one of the two rows, and the secondary fluid collector (32) intended to collect the fluid escaping from the basic channels (38) of the other of the two rows (40), are separated by a wall element (50) which is inclined in said first and second directions (44, 46).

2. Plate (10, 10a, 10b) according to claim 1, characterised in that said main distributor (26) and said main collector (34) each extend generally in said second direction (46) and are located respectively at two opposite ends, as seen in said first direction (44), of said network of channels (30) formed by the plurality of rows (40).

3. Plate (10, 10a, 10b) according to claim 1, characterised in that said wall element (50) is connected to a side wall (42) of one of the two rows which is located closest to the end of this row in the first direction (44), and is also connected to a side wall (42) of the other of the two rows which is located closest to the end of this other row in a direction opposite said first direction (44).

4. Plate (10, 10a, 10b) according to claim 1, characterised in that said main distributor and collector (26, 34), and secondary distributors and collectors (28, 32), each have a substantially triangular shape in plan view.

5. Plate (10, 10a, 10b) according to claim 1, characterised in that the fluid inlet (24) and the fluid outlet (36) are located respectively at two opposite ends, as seen in said second direction (46), of said network of channels (30) formed by the plurality of rows (40).

6. Plate (10, 10a, 10b) according to claim 1, characterised in that each basic channel (38) has a width of between approximately 0.1 and 1 mm.

7. Plate (10, 10a, 10b) according to claim 1, characterised in that each basic channel (38) of the network of channels is at least partially coated with said catalyst (18a, 18b).

8. Plate (10, 10a, 10b) according to claim 1, characterised in that said catalyst (18a, 18b) is made from a material selected from the group consisting of iron-nickel alloys, polymers and ceramics.

9. Plate (10) according to claim 1, characterised in that the other of the two faces of said plate also delimits another fluid circulation zone.

10. Plate (10) according to claim 1, characterised in that the other of the two faces of said plate also delimits another fluid circulation zone which is at least partially coated with a catalyst (18a, 18b) allowing a catalytic chemical reaction within this other zone.

* * * * *